US010285219B2

(12) United States Patent
Fetfatsidis et al.

(10) Patent No.: US 10,285,219 B2
(45) Date of Patent: May 7, 2019

(54) ELECTRICAL CURING OF COMPOSITE STRUCTURES

(71) Applicant: AURORA FLIGHT SCIENCES CORPORATION, Manassas, VA (US)

(72) Inventors: Konstantine Fetfatsidis, Cambridge, MA (US); Daniel Reagan, Lowell, MA (US); Denis Tolmachov, Chelmsford, MA (US); Kyle Breingan, Billerica, MA (US); Darlene Hemstreet, Haverhill, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 397 days.

(21) Appl. No.: 14/865,833

(22) Filed: Sep. 25, 2015

(65) Prior Publication Data

US 2016/0089863 A1    Mar. 31, 2016

Related U.S. Application Data

(60) Provisional application No. 62/055,504, filed on Sep. 25, 2014.

(51) Int. Cl.
*H05B 3/06* (2006.01)
*B32B 5/02* (2006.01)
(Continued)

(52) U.S. Cl.
CPC ............... *H05B 3/06* (2013.01); *B32B 5/02* (2013.01); *B32B 5/22* (2013.01); *B32B 5/26* (2013.01);
(Continued)

(58) Field of Classification Search
None
See application file for complete search history.

(56) References Cited

U.S. PATENT DOCUMENTS 3,612,744 A   10/1971  Thomas
4,352,142 A    9/1982  Olson
(Continued)

FOREIGN PATENT DOCUMENTS

WO   WO91/11891      8/1991
WO   WO2011/064707   6/2011
WO   WO2012/159608  11/2012

OTHER PUBLICATIONS

Athanasopoulos, N., et al., "A Study on the Effect of Joule-Heating During the Liquid Composite Molding (LCM) Process and on the Curing of CFRP Composite Laminates," The 10th International Conference on Flow Processes in Composite Materials (FPCM10) Monte Verita, Ascona, CH—Jul. 11-15, 2010.
(Continued)

*Primary Examiner* — Peter A Salamon
(74) *Attorney, Agent, or Firm* — Michael Stanley Tomsa; McAndrews, Held & Malloy, Ltd.; Eugene H. Nahm

(57) ABSTRACT

A composite structure cured by the process of: electrically coupling a first lead to a first portion of said composite structure; electrically coupling a second lead to a second portion of said composite structure; and using an electric power source to pass electric current through said composite structure from said first portion to said second portion, wherein passing said electric current through said composite structure causes the temperature of at least a portion of said composite structure increase to a predetermined temperature.

25 Claims, 13 Drawing Sheets

(51) Int. Cl.
*B32B 5/22* (2006.01)
*B32B 5/26* (2006.01)
*H05B 3/00* (2006.01)

(52) U.S. Cl.
CPC ...... *H05B 3/0004* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2307/202* (2013.01); *B32B 2307/54* (2013.01); *B32B 2603/00* (2013.01); *B32B 2605/00* (2013.01)

(56) References Cited

U.S. PATENT DOCUMENTS

| | | | |
|---|---|---|---|
| 4,537,469 A | 8/1985 | Kircher | |
| 4,560,428 A * | 12/1985 | Sherrick | B29C 35/0272 156/273.9 |
| 4,937,125 A | 6/1990 | Sanmartin et al. | |
| 5,071,506 A * | 12/1991 | Nelson | B29C 33/40 156/156 |
| 5,412,181 A | 5/1995 | Giamati | |
| 5,433,995 A * | 7/1995 | Matthews | F24C 15/22 428/300.7 |
| 5,656,231 A * | 8/1997 | Blackmore | B29C 33/06 264/258 |
| 5,925,275 A | 7/1999 | Lawson et al. | |
| 5,971,323 A | 10/1999 | Rauch et al. | |
| 6,137,083 A | 10/2000 | Bost et al. | |
| 6,227,492 B1 | 5/2001 | Schellhase et al. | |
| 6,320,118 B1 * | 11/2001 | Pridham | B29C 65/4855 174/2 |
| 6,440,521 B1 | 8/2002 | Moore | |
| 6,743,504 B1 | 6/2004 | Allen et al. | |
| 6,927,362 B2 | 8/2005 | Haluschka et al. | |
| 7,039,276 B2 | 5/2006 | Aldridge et al. | |
| 7,064,302 B2 | 6/2006 | Brunner et al. | |
| 7,157,663 B1 | 1/2007 | Kismarton | |
| 7,391,622 B2 | 6/2008 | Marshall et al. | |
| 7,777,162 B2 | 8/2010 | Park | |
| 7,919,037 B1 * | 4/2011 | Boyce | B29C 35/0272 264/105 |
| 8,240,982 B2 | 8/2012 | Vauchel | |
| 8,937,254 B2 | 1/2015 | Wen et al. | |
| 2004/0055699 A1 * | 3/2004 | Smith | B29C 65/344 156/273.9 |
| 2005/0062024 A1 | 3/2005 | Bessette et al. | |
| 2007/0175573 A1 * | 8/2007 | Fox | B29C 70/34 156/196 |
| 2007/0223205 A1 | 9/2007 | Liang et al. | |
| 2007/0259135 A1 | 11/2007 | Hascalovich et al. | |
| 2008/0277057 A1 | 11/2008 | Montgomery et al. | |
| 2009/0149997 A1 | 6/2009 | Stothers | |
| 2009/0289232 A1 | 11/2009 | Rice | |
| 2010/0051471 A1 * | 3/2010 | Meng | B82Y 30/00 205/414 |
| 2010/0133261 A1 * | 6/2010 | Schildt | H05B 6/105 219/635 |
| 2010/0170746 A1 | 7/2010 | Restuccia et al. | |
| 2011/0011627 A1 | 1/2011 | Aspas Puertolas | |
| 2011/0120748 A1 | 5/2011 | Bailey | |
| 2011/0139351 A1 * | 6/2011 | Morton | F16L 55/1686 156/185 |
| 2011/0180524 A1 | 7/2011 | Brittingham et al. | |
| 2011/0272082 A1 | 11/2011 | Dunleavy et al. | |
| 2011/0290784 A1 | 12/2011 | Orawetz et al. | |
| 2011/0290786 A1 | 12/2011 | Hu et al. | |
| 2012/0103685 A1 | 5/2012 | Blanchard et al. | |
| 2012/0132634 A1 | 5/2012 | Song | |
| 2012/0197482 A1 | 8/2012 | Moser et al. | |
| 2013/0043342 A1 | 2/2013 | Nordin et al. | |
| 2013/0068747 A1 | 3/2013 | Armatorio et al. | |
| 2013/0160462 A1 | 6/2013 | Broughton et al. | |
| 2013/0227952 A1 | 9/2013 | Grip et al. | |
| 2013/0319727 A1 | 12/2013 | Wen et al. | |
| 2014/0014640 A1 | 1/2014 | Calder et al. | |
| 2014/0070054 A1 | 3/2014 | Burton et al. | |
| 2014/0231402 A1 * | 8/2014 | Matsen | B29C 35/0227 219/212 |
| 2014/0234552 A1 | 8/2014 | Frankenberger | |
| 2016/0302264 A1 | 10/2016 | Kessler et al. | |
| 2016/0343467 A1 | 11/2016 | Wen et al. | |

OTHER PUBLICATIONS

Sloan, Jeff, "787 Integrates New Composite Wing Deicing System, Case Study Post: Dec. 30, 2008, downloaded at http://www.compositesworld.com/articles/787-integrates-new-composite-wing-deicing-systemATHANASOPOULOS, N., et al., Resistive heating of multidirectional and unidirectional dry carbon fibre preforms," Composites Science and Technology 72 (2012) 1273-1282, Available online May 7, 2012.

Burnette, Heyward, "SBIR Program Lightweight, Highly Conductive Electromagnetic Shielding Coatings", Air Force Print News Today, Sep. 14, 2010.

Hayes, S. A., "Inherent Cure of Carbon Fibre Composites Using their Electrical Resistance," The 19th International Conference on Composite Materials.

Joseph, Christopher, et al., "Electrical resistance curing of carbon-fibre/epoxy composites," Composites Science and Technology 60 (2000) 315-319, Accepted Aug. 4, 1999.

Kim, Yoon Jin, et al., "Electrical conductivity of chemically modified multiwalled carbon nanotube/epoxy composites," Carbon 43 (2005) 23-30, Available online Oct. 18, 2004.

Lin, Mark, et al., The Manufacture of Composite Structures with a Built-in Network of Piezoceramics, Composites Science and Technology 62 (2002) 919-939.

Martin, C.A., et al., "Electric field-induced aligned multi-wall carbon nanotube networks in epoxy composites," Polymer 46 (2005) 877-886, Available online Dec. 15, 2004.

Mas, Bartolome, et al., Thermoset curing through Joule heating of nanocarbons for composite manufacture, repair and soldering, Carbon 63 (2013) 523-529, Available online Jul. 15, 2013.

Patz, Nicholas, Patz Materials & Technologies: PMT-F4, Aug. 1, 2011.

Rider, A.N., et al., "Internal resistance heating for homogeneous curing of adhesively bonded repairs," International Journal of Adhesion & Adhesives 31 (3011) 168-176, Available online Jan. 7, 2011.

Sloan, Jeff, 787 Integrates New Composite Wing Deicing System, Case Study Post: Dec. 30, 2008, downloaded at http://www.compositesworld.com/articles/787-integrates-new-composite-wing-deicing-system.

* cited by examiner

| Testing Purpose | Samples | Sample # | Sample Size [mm] | | Heat Source | Pressure Source | CNT [Y/N] | # of Layers | Ply Stack | CNT Stack [Lamina*] | CNT Layers |
|---|---|---|---|---|---|---|---|---|---|---|---|
| | | | L (1) | W (2) | | | | | | | |
| Proof of Concept | 1 | 1a | 80 | 30 | Oven | Vac | N | 8 | $[0]_8$ | Na | 0 |
| | 1 | 2a | 80 | 30 | Resistance | Vac | N | 8 | $[0]_8$ | Na | 0 |
| CNT Distribution | 1 | 3a | 80 | 30 | Resistance | Vac | Y | 8 | $[0]_8$ | [0*/0*/0*/0*/0*/0*/0*/0] | 7 |
| | 1 | 4a | 80 | 30 | Resistance | Vac | Y | 8 | $[0]_8$ | $[0/0/0/0*]_s$ | 2 |
| Perpendicular Current Flow | 1 | 5a | 80 | 30 | Resistance | Vac | N | 8 | $[90]_8$ | Na | 0 |
| | 1 | 6a | 80 | 30 | Resistance | Vac | Y | 8 | $[90]_8$ | $[0*/0/0*/0]_s$ | 4 |
| CNT Channeling | 3 | 7a/B/C | 80 | 30 | Resistance | Vac | Y | 2 | $[0]_2$ | [0*/0] | 1 |

Figure 2

|  | T 1-2 | T 2-2 | T 3-2 | T 4-2 | T 2-3 | T 3-3 | T 4-3 | STD |
|---|---|---|---|---|---|---|---|---|
| W/ CNT (6A) | 49.8 | 53.6 | 58.4 | 58.3 | 42.3 | 52.6 | 47.6 | 5.79 |
| W/O CNT (5A) | 60.3 | 67.1 | 62.2 | 60.5 | 39 | 55.5 | 56.5 | 8.92 |
| % diff. | 17.41 | 20.11 | 6.10 | 3.63 | -8.462 | 5.22 | 15.75 | |

Figure 8a

ELECTRICAL CURING OF COMPOSITE STRUCTURES

This application claims priority to U.S. Patent Appln. No. 62/055,504, filed Sep. 25, 2014, the contents of which are incorporated herein by reference.

TECHNICAL FIELD

The present invention relates generally to methods of curing composite structures. More particularly, the invention relates to systems, methods, and apparatuses for electrically curing composite structures.

BACKGROUND INFORMATION

Modern vehicles and wind turbines often contain structures fabricated from composite materials, such as, for example, carbon fiber composites. In use, such composite materials undergo tensile strain due to environmental factors such as: extreme wind-speeds, air-resistance, and in-flight vibration.

Using traditional methods, curing composite structures is costly and typically requires a significant amount of time and energy to provide the required heat for curing. A common curing process uses an autoclave, which typically applies a combination of high temperature and pressure to heat a desired composite structure. In an autoclave, the temperature within the chamber must first increase prior to the composite structure. The composite structure is then heated from the outer surfaces, and sufficient time must be allowed to ensure that the inner core reaches similar temperatures. Typically, curing large structures such as wing skins and wind turbine blades requires very large autoclaves. However, these conditions make it extremely expensive to cure such large structures, where investment in specialized equipment or transportation is needed to secure autoclaves (or ovens, in some cases, as discussed below) of sufficient size. As a result, a wide variety of problems arise including increased manufacturing costs due to the significant amount of time and energy required to heat an autoclave, and size restrictions on composite structures desired to be cured imposed by the dimensions of an autoclave chamber.

In an effort to save time and costs, the aerospace industry has moved toward out-of-autoclave (OOA) materials, which only require atmospheric pressure via a vacuum to cure. However, ovens are still used to provide heat during the curing process of OOA materials. While OOA materials provide advantages over using autoclaves, the ovens used to cure them still suffer from the above deficiencies. For example, like autoclaves, ovens cure composite structures by heating an intermediate material inside a size-restrictive chamber. Another drawback of traditional ovens and autoclaves is that preheating an autoclave or oven to the curing temperature requires a significant amount of time and energy, which reduces throughput while increasing manufacturing costs.

Thus, what is needed is an economical curing system capable of heating a composite structure without requiring the aforementioned autoclaves and ovens, without sacrificing quality, or strength, of the composite structure. Curing of these composite structures internally during manufacture may significantly reduce cost, improve strength, and remove size limitations of cured composites.

SUMMARY

The present disclosure endeavors to provide an electrical curing system for curing composite materials.

According to a first aspect of the present invention, a method of electrically heating a composite material comprises the steps of: electrically coupling a first lead to a first portion of said composite material; electrically coupling a second lead to a second portion of said composite material; and using an electric power source to pass electric current through said composite material from said first portion to said second portion, wherein passing said electric current through said composite material causes the temperature of said composite material increase to a predetermined temperature at a predetermined location.

According to a second aspect of the present invention, a composite structure is cured by the process of: electrically coupling a first lead to a first portion of said composite structure; electrically coupling a second lead to a second portion of said composite structure; and using an electric power source to pass electric current through said composite structure from said first portion to said second portion, wherein passing said electric current through said composite structure causes the temperature of at least a portion of said composite structure increase to a predetermined temperature.

In certain aspects, said predetermined temperature cures said predetermined location.

In certain aspects, said composite structure, or material, comprise two layers of pre-impregnated composite carbon fiber material having carbon nanotubes positioned between said two layers of pre-impregnated composite carbon fiber material.

In certain aspects, an electrical contact (e.g., copper tape) may be positioned at each of said first position and said second position to improve conductivity across the composite structure, or material.

In certain aspects, one or more resistors are electrically connected in parallel with said composite structure, or material, wherein said resistors may be cooled by vacuum exhaust.

In certain aspects, said composite structure, or material, is insulated from a tool using an insulated material.

In certain aspects, (1) said first portion is at a first distal end and the said second portion a second distal end, and/or (2) said predetermined location is at least the region defined between said first distal end and second distal end.

In certain aspects, the composite structure, or material, is (1) laid up using a low-cost tool to form a composite structure, and (2) cured while the composite structure is freestanding. The low-cost tool and the composite structure may have a same or a similar coefficient of thermal expansion In certain aspects, the temperature of at least a portion of said composite structure is measured via a thermocouple positioned on a surface of said composite structure.

BRIEF DESCRIPTION OF THE DRAWINGS

These and other advantages of the present invention will be readily understood with reference to the following specifications and attached drawings wherein:

FIG. 2 illustrates a table summarizing composite material samples to be tested.

FIG. 8a shows the maximum temperature attained with the tested power supply.

DETAILED DESCRIPTION OF THE PREFERRED EMBODIMENTS

Figure 1:
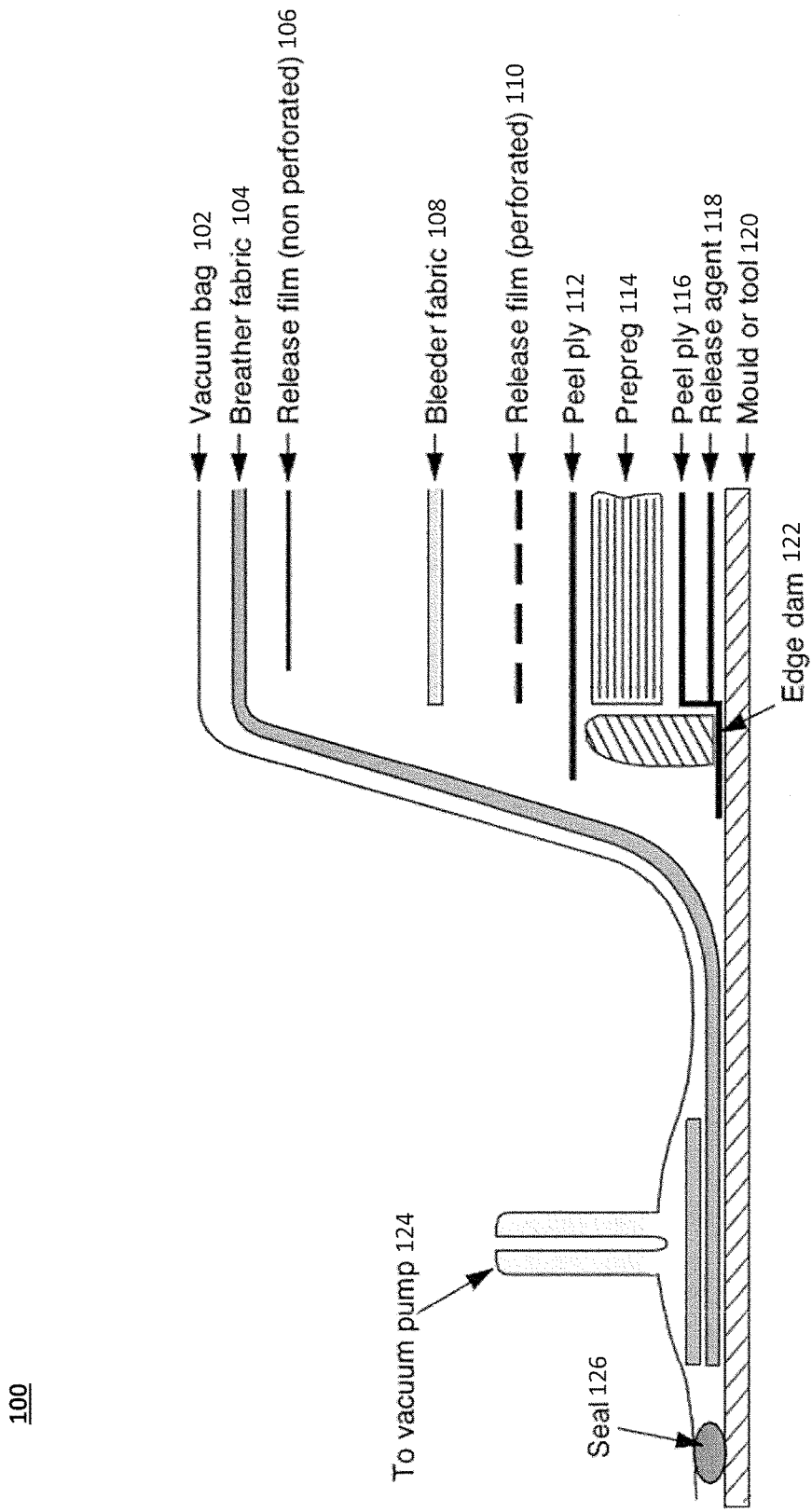
FIG. 1 illustrates an exemplary diagram of a vacuum cure setup.

Preferred embodiments of the present invention will be described hereinbelow with reference to the accompanying drawings. In the following description, certain well-known functions or constructions are not described in detail since they would obscure the invention in unnecessary detail. For this application the following terms and definitions shall apply:

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para-aramid synthetic fibers, Fibre Metal Laminate ("FML"), etc.) and a matrix material (e.g., epoxies, polyimides, aluminum, titanium, and alumina, including, without limitation, plastic resin, polyester resin, polycarbonate resin, casting resin, polymer resin, thermoplastic, acrylic resin, chemical resin, and dry resin). Further, composite materials may comprise specific fibers embedded in the matrix material, while hybrid composite materials may be achieved via the addition of some complementary materials (e.g., two or more fiber materials) to the basic fiber/epoxy matrix.

The term "composite laminates" as used herein, refers to a type of composite material assembled from layers (i.e., a "ply") of additive material and a matrix material. For example, layers of additive material, such as fibrous composite materials, may be joined to provide desired engineering properties, including in-plane stiffness, bending stiffness, strength, and coefficient of thermal expansion. Layers of different materials may be used, resulting in a hybrid laminate. The individual layers may be orthotropic (i.e., principal properties in orthogonal directions) or transversely isotropic (i.e., isotropic properties in the transverse plane) with the laminate then exhibiting anisotropic (i.e., variable direction of principal properties), orthotropic, or quasi-isotropic properties. Quasi-isotropic laminates exhibit isotropic (i.e., independent of direction) in-plane response, but are not restricted to isotropic out-of-plane (bending) response. Depending upon the stacking sequence of the individual layers, the laminate may exhibit coupling between in-plane and out-of-plane response. An example of bending-stretching coupling is the presence of curvature developing as a result of in-plane loading.

The term "composite structure" as used herein, refers to structures, parts, or components, fabricated, at least in part, using a composite material, including, without limitation, composite laminates.

Methods to reduce energy consumption during the manufacture of composite structures are constantly being explored. The mechanical properties of carbon fiber reinforced polymers have proven to be greatly superior to metal alloys for many applications. As explained above, the method of curing carbon fiber composites has remained largely unchanged over the last three decades. That is, ovens and autoclaves are traditionally used to provide the heat required to cure the composite structures. For example, in the aerospace industry, the autoclave process is commonly used to cure the matrix material in composite structures due to the high temperatures and pressures achievable. The combination of high temperature and pressure directly affects composite structure quality.

In an effort to save time and costs, the aerospace industry has moved toward OOA materials. While these materials only require atmospheric pressure via a vacuum to cure, they still require the use of an oven to provide heat during the curing process. However, as will be discussed below with reference to examples, the method of electrically curing a composite material (e.g., carbon fiber) requires significantly less energy and is capable of curing composites at a much faster rate since the path length for conduction would be greatly reduced. That is, without relying on conduction from the outside surface through the thickness, there is no need to wait for the oven/autoclave chamber to heat up. The result is a higher throughput and reduced costs (e.g., less time, less energy, fewer parts, etc.). Markets such as aerospace, whether military or commercial, and wind energy may utilize this method of curing carbon fiber composites, particularly where the size of large structures (e.g., wing skins or wind turbine blades) would prohibit the use of an oven or autoclave, or would make investment in such equipment incredibly expensive. The approach disclosed herein would allow for the rapid, inexpensive, and even on-site manufacture (e.g., where transportation becomes an issue, such as is the case of wind turbine blades) of composite structures.

As will be discussed in greater detail below, an improved curing system and method may be facilitated by electrically curing the composite structure. Indeed, a composite structure, as disclosed herein, may be resistively cured under an atmospheric-pressure vacuum bag without requiring an autoclave or oven. This OOA method is advantageous for a number or reasons. For example, an autoclave is expensive to operate and limits the size of components. Further, autoclaves are also relatively labor intensive and can yield only a limited production. However electrically curing the composite structure reduces time and energy, without requiring pre-heating or sacrificing quality/strength. Known OOA methods, such as oven curing, on the other hand, have large energy consumption.

In certain aspects, electrical curing, also referred to as electrical resistance curing, methods may be accomplished using, for example, CF pre-impregnated resin systems ("pre-preg" or "pre-preg material", i.e., composite fibers having uncured matrix material already present), embeddable conductors, which may function as resistors, (e.g., carbon nanotubes ("CNT") material), electrical contacts, and/or a tool (e.g., a mold). While additional aspects will be discussed below in greater detail, in one aspect, the curing system may be provided using one or more power supplies, electrical contacts (e.g., copper tape), and the consumables that are part of a vacuum bag layup (e.g., breather material, peel ply, etc.), which may be used along with vacuum bagging to provide consolidation thereof. During layup, carbon pre-preg plies, for instance, may be laid up onto a foam/composite tool (e.g., foam/composite/3D printed material) with low thermal conductivity and similar coefficient of thermal expansion ("CTE"). Indeed, other materials, such as aluminum tooling, for example, may draw too much heat away from the composite structure being cured and, therefore, may not always enable higher temperatures to be achieved. With 3D printed tooling, specifically tooling that is comprised of polymer materials, the tooling can be designed with internal conduits to pass through a cooling gas or fluid. By actively cooling the tooling, a lower temperature polymer can be used for the tooling material. Lower temperature polymers, for example ABS vs. Ultem (high temp), are favorable from a cost and ease of use standpoint. The cooling of the tooling and the heating of the composite would be monitored in real-time with thermal couples (temperature sensors) placed at multiple locations across both the tooling and the composite material. These temperature measurements would be used by a control system to ensure that the temperature of the tooling and the composite remain in an acceptable range. For example, hot spots in the tooling would receive a higher flow of cooling fluid. This ability to cool or heat local spots in the tooling would be enabled by throttles (valves) located at various points across the cooling conduits. Similarly for the composite material, there would be multiple points for connecting electrical heat lines to the composite material. Each heat line would be associated with heating a spatial area on the composite material.

To reduce tooling costs, while maintaining dimensional accuracy during cure (e.g., to avoid, or mitigate, shrinkage, warping, etc.), a low-cost tool may be employed where the composite structure may be removed and cured while free standing. While electrical curing is particularly beneficial when fabricating larger composite structures, it also enables low quantity/volume component fabrication due, in part, to the low-cost tooling capabilities.

To provide electrical contacts, a conductor material, such as copper tape, may be laid down at each end of the composite structure (whether by hand or via automated fiber placement). Depending on composite structure thickness (e.g., laminate thickness), one or more connections may be made to the copper tape ends via, for example (1) a detachable coupling (e.g., alligator clips, terminal blocks, posts, crimp-on connectors, insulation displacement connectors, plug and socket connectors, blade connectors, ring and spade terminals, etc.) or (2) a permanent, or semi-permanent, means (e.g., by soldering connections to the conductor material). In certain embodiments, electrodes onto the copper tape using three dimensional printing technology Experimental testing has shown that an equivalent cure of the composite structure may be achieved at lower temperatures when using electrical curing methods (versus oven curing) with improved short-beam shear ("SBS") properties. Indeed, by heating the composite structure from within, greater densification is achieved, thereby leading to enhance mechanical properties. For example, temperatures above 300° F. (Fahrenheit) can be achieved to cure an 8-ply laminate using only a 150 watt Power Supply (15 Amps, 10 Volts). Conversely, a small 0.95 cubic foot oven uses 1200 watt of power. Even assuming a similar cure time, the subject electrical curing methods would use less than 87% of the power that would be used by the oven (and thus 87% less cost in utility costs). Because electrical curing cures from the inside out, cure cycle time is also less than that required for conventional oven curing, thereby realizing even greater cost savings.

While the disclosure is generally described as employing CNT material as the embeddable conductor, other embeddable conductors may be used. However, over the last decade, CNT has become an increasingly viable material for structural and electrical uses. CNTs are allotropes of carbon with a cylindrical nanostructure and are an ideal conductor for embedment within composite materials. Another possible carbon conductor may be carbon nanofibers/nanofilaments (CNF). CNFs (aka vapor grown carbon fibers (VGCFs) or vapor grown carbon nanofibers (VGCNFs)) are nanostructures with graphene layers arranged as stacked cones, cups, or plates, whereas CNTs are CNFs with graphene layers wrapped into cylinders.

Electrical curing of carbon composites has shown to save significant amounts of energy. In certain aspects, vertically aligned CNTs may be implemented between one or more layers of carbon/epoxy pre-preg to homogenize the conductivity of the carbon composite and reduce the dependence on fiber direction. Testing indicated the composite structures with CNTs resulted in greater uniformity of temperature across the composite structure's surface. Conversely, when fibers are simply oriented perpendicular to the fiber direction, no increase in efficiency was observed. Further, using various tool materials to insulate the composite has proven to significantly reduce the energy requirements as well. To verify the effectiveness of the electrical cure procedure, various fiber orientations, CNT distributions, CNC distributions and cure temperatures were explored. For example, with regard to CNT distributions, the CNTs may be vertically-aligned, aligned in-plane with the carbon fibers, and/or arranged in a zig-zag pattern.

Temperature measurements were recorded with thermocouples and infrared (IR) cameras, while SBS tests were used to validate samples as completely cured. In addition, recommendations for further study were given.

The results of the testing indicate that electrical curing can be used to provide the heat necessary for curing OOA composite structures, such as CF, under vacuum pressure. Applying energy directly to the object desired in lieu of applying the energy to an intermediate material to heat the desired composite structure is much more efficient. In a traditional oven or autoclave, however, the temperature within the chamber must first increase prior to the composite structure. The composite structure is then heated from the outer surfaces, and sufficient time must be allowed to ensure that the inner core reaches similar temperatures. With electrical curing, the current flows through the composite material (e.g., CFs), transferring heat via conduction to the adjacent matrix which then generates heat as a by-product of the crosslinking polymers. The high conductivity of CFs makes this process of heating from the inside out possible without embedding additional material. Suitable OOA epoxies include, for example, TC 350-1 and TC 275 resin matrices, available from TenCate Advanced Composites USA Inc.

Testing. A number of experiments were performed to confirm that enough heat could be generated to cure a CF composite using less power/energy and in less time than with an oven or an autoclave, without sacrificing mechanical properties. CNTs were added to various samples to determine if and how the cure cycle was affected. SBS tests were performed on the samples to compare their mechanical properties and qualitatively compare degree of cure. CF pre-preg material was cut and layered for samples. Some samples were to be oven-cured and others would use resistive curing. A limited number of samples could be prepared with CNTs due to their availability. Resistive curing was performed on 2-ply and 8-ply samples. All samples were cured under vacuum pressure (about 26 in. Hg).

The samples were fabricated from pre-preg CF material cut to 30 mm by 80 mm samples. Copper tape was applied to layer edge to improve conductivity across fibers. In certain samples, CNTs were applied in-between layers where specified. The vacuum bag procedure was followed pursuant to the pre-preg manufacturer's specifications, where FIG. 1 illustrates an exemplary diagram of a vacuum cure setup 100. As illustrated, a vacuum cure setup 100 may comprise: a vacuum bag 102, breather fabric 104, first release film 106 (e.g., non-perforated release film), a bleeder fabric 108, a second release film 110 (e.g., perforated release film), a first layer of peel ply 112, a composite material to be cured 114 (e.g., pre-preg), a second layer of peel ply 116, a release agent 118, and a tool 120. The vacuum bag 102 may be sealed to the tool 120 at the edges to form an air tight seal using a seal 126. Air may then be vacuumed from the vacuum cure setup 100 using a pump via a vacuum nozzle 124. An edge dam 122 may be provided along the perimeter of the composite material 114, or portion thereof, to maintain alignment and prevent deformation.

FIG. 2 illustrates a summary of the composite samples prepared and tested based on the CF orientation, type of cure and CNT position within the stacking sequence. An objective of this test was to improve the methods of resistance curing and increase its potential to be applied in industry.

Several parameters were of interest, including orientation of the CFs, addition of the CNTs, and placement of the CNTs within the laminate. To determine the degree of cure, SBS tests were performed on the cured 8-layer samples.

Figure 3:
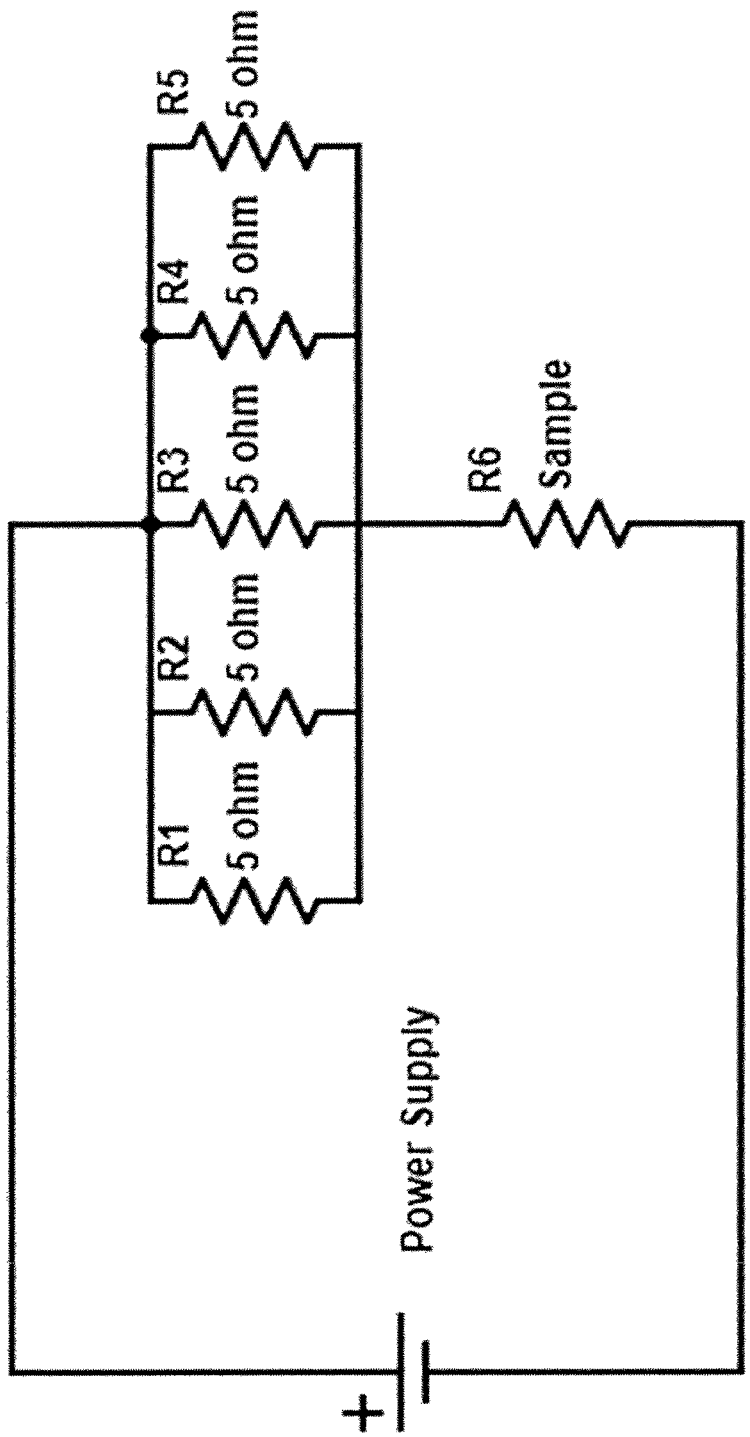
FIG. 3 illustrates a circuit schematic of the composite material test set up.

A first sample of 8 layers was oven-cured from pre-preg material, while the remaining samples were resistively cured similar 8-layer samples of pre-preg material. Copper tape was inserted between the layers at each end of the sample and wires were soldered to the copper tape. Five resistors (5 ohms each) were connected together in parallel to increase the resistance of the circuit by 1 ohm to avoid tripping the failsafe on the power supply. Alligator clips were used to connect the wires from the sample and resistors to the power supply. A circuit schematic of the set-up is illustrated in FIG. 3. The power supply was capable of outputting 15 Amps and 10 volts. An IR gun was used during the curing process to check the surface temperatures of the sample and the resistors and changes of geometry and locations near connections. The resistor temperatures rose to over 135° C. Therefore, in order to avoid overheating, they were placed in the path of the vacuum system exhaust on a large aluminum plate.

Figure 4:
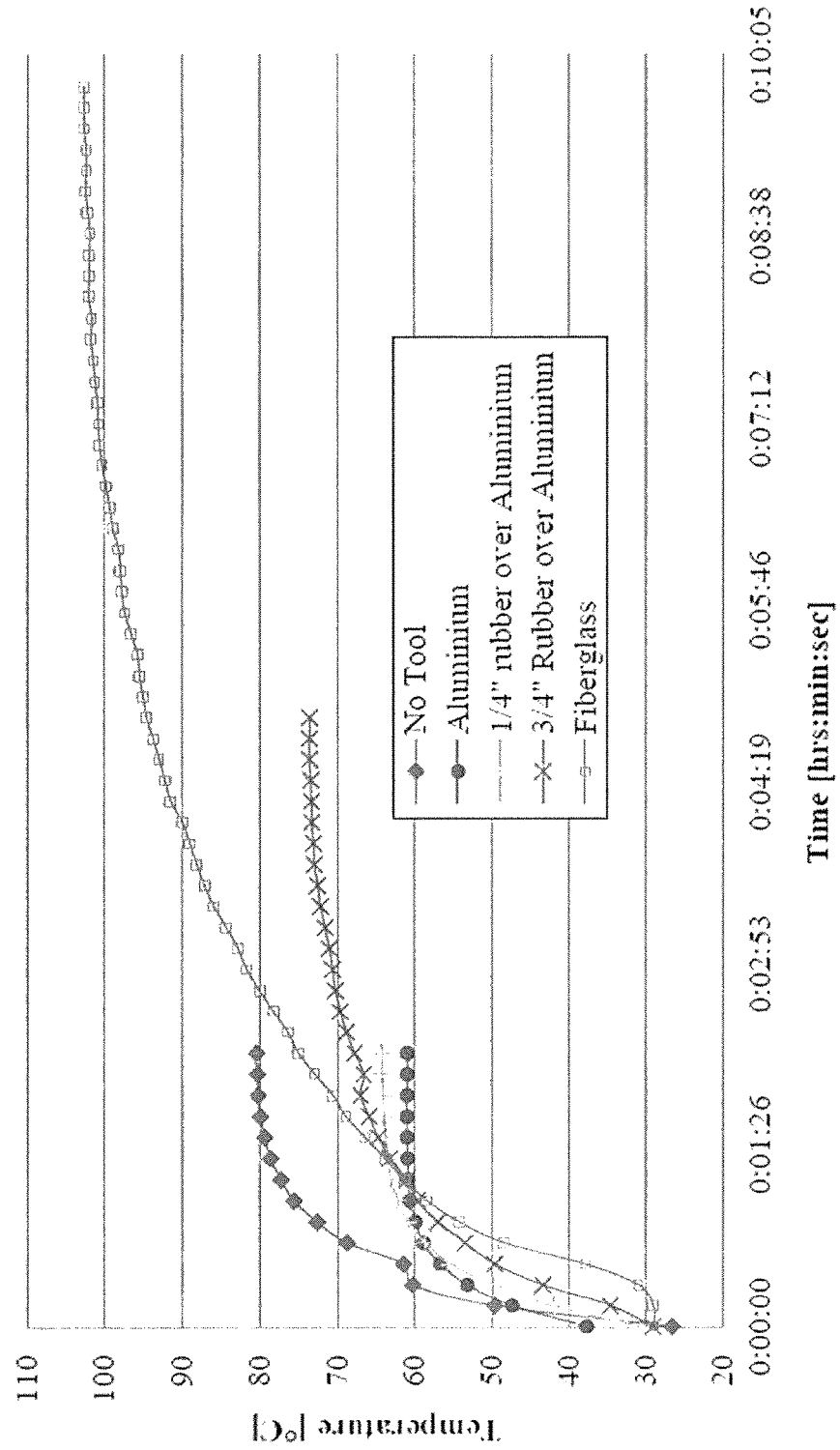
FIG. 4 illustrates a chart of the effects of various tool materials on the composite material samples.
Figure 5:
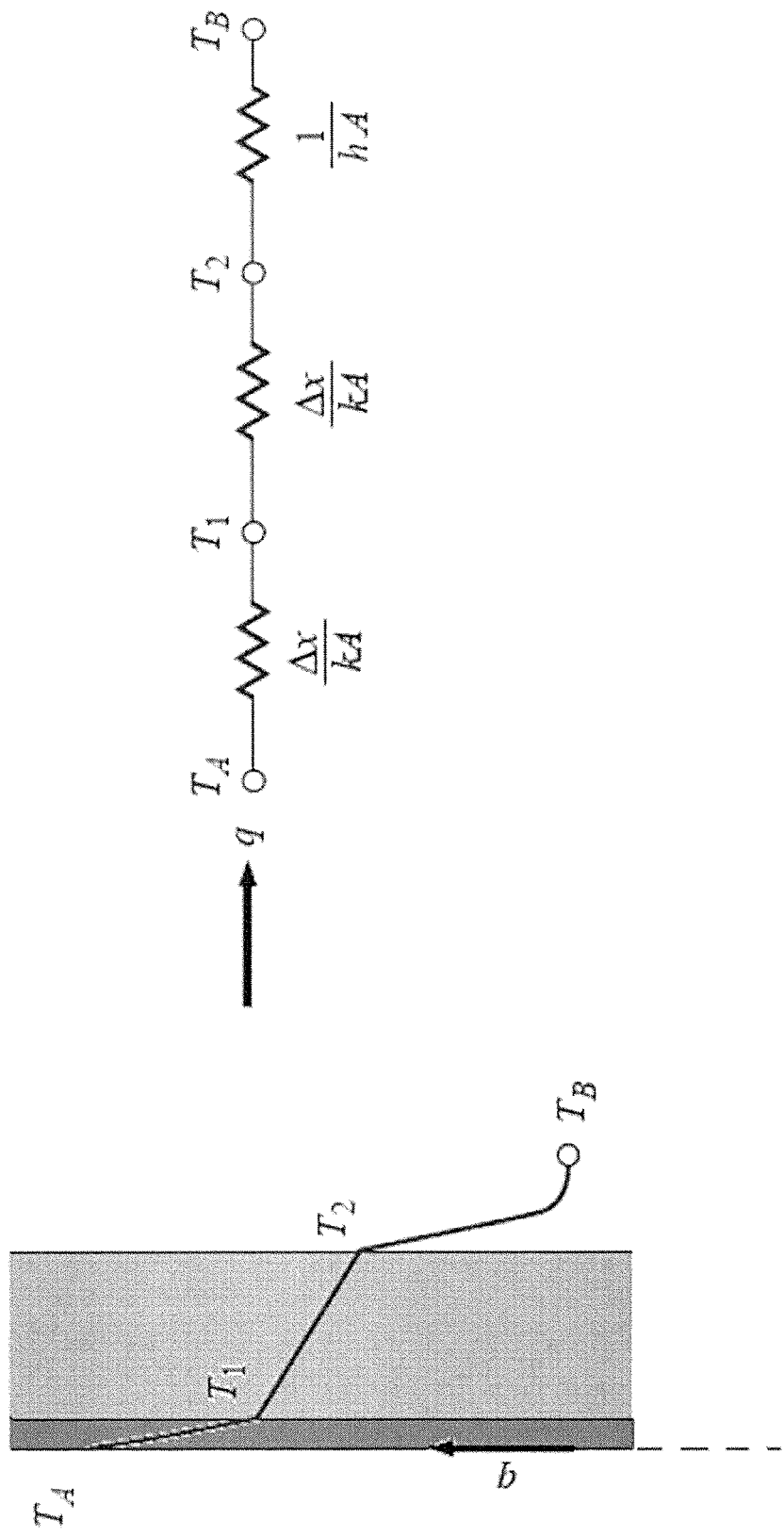
FIG. 5 illustrates a circuit model used to estimate the conductive heat transfer through the materials involved in the tooling process.

In an attempt to further conserve energy, various insulated materials were explored during the resistive curing of the carbon pre-preg. As shown in FIG. 4, the temperature step is more than doubled by implementing a fiberglass tool (k=0.04 W/m-K) in place of a conventional aluminum tool (k=205 W/m-K at 25° C.). The same fiberglass tool was then used in the resistive curing process of all samples tested. Thus, a tool material of the same or a similar CTE may be used. A circuit model can be used to estimate the conductive heat transfer through the materials involved in the tooling process. For the model shown in FIG. 5, $T_A$ refers to the temperature at the centerline as the model is using a symmetric setup. Further model refinement can be made to account for complex tool shapes, other vacuum bagging materials, and convective heat transfer. Variation of thermal conductivity with temperature can also be accounted for.

$$q = \frac{T_A - T_B}{\frac{\Delta x}{kA} + \frac{\Delta x}{kA} + \frac{1}{hA}} \quad \text{Equation 1}$$

$$k = k_0(1 - \beta T) \quad \text{Equation 2}$$

Where: $\beta$ is the temperature coefficient of thermal conductivity (1/C°), k is the thermal conductivity (W/m²C°), q is the heat transfer rate (KJ/s), and h is the heat transfer coefficient (W/m²C°).

Figure 6:
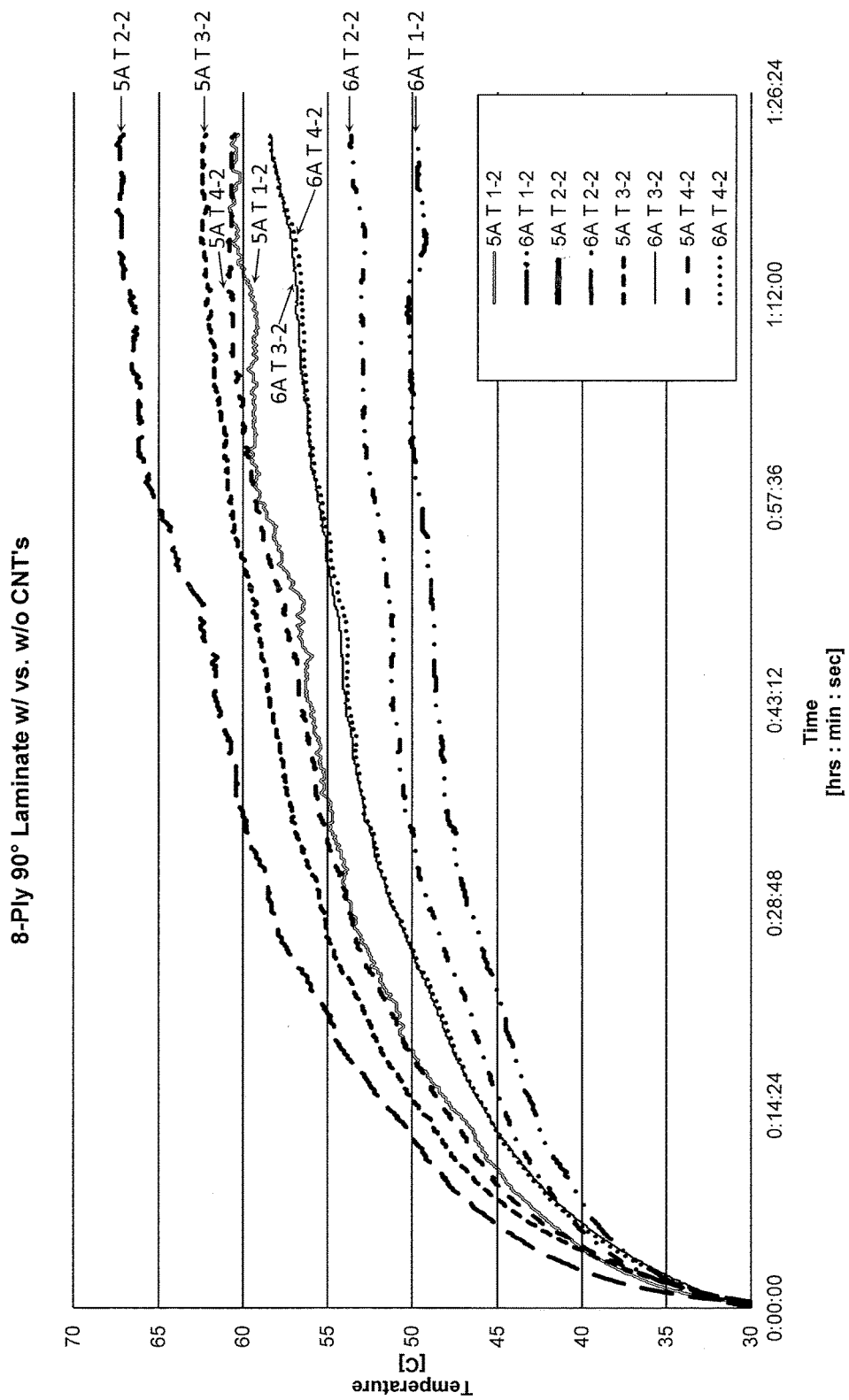
FIGS. 6 and 7 illustrate graphs of the recorded temperatures from samples with fibers oriented perpendicular to the flow of current.
Figure 7:
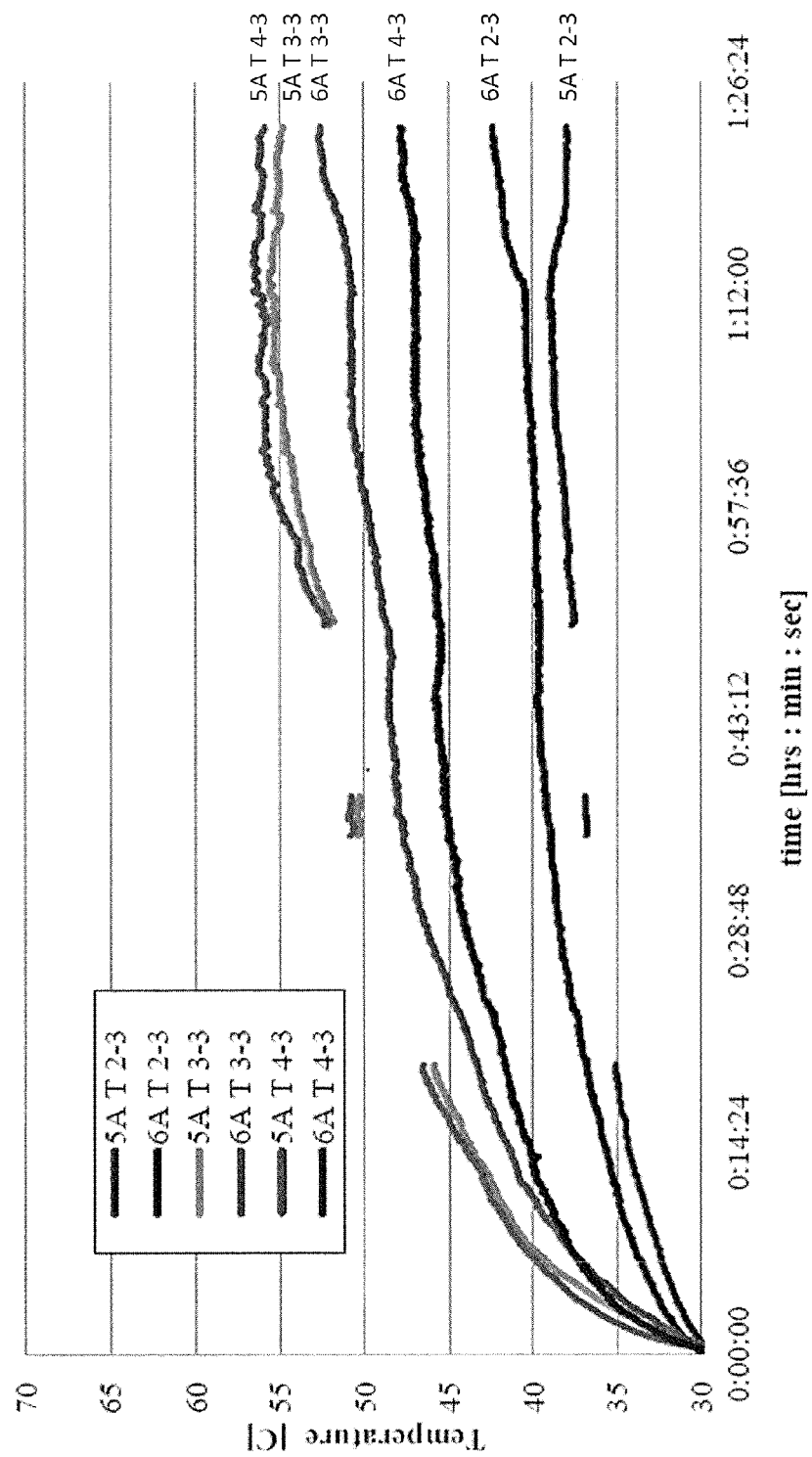
Figure 8B:
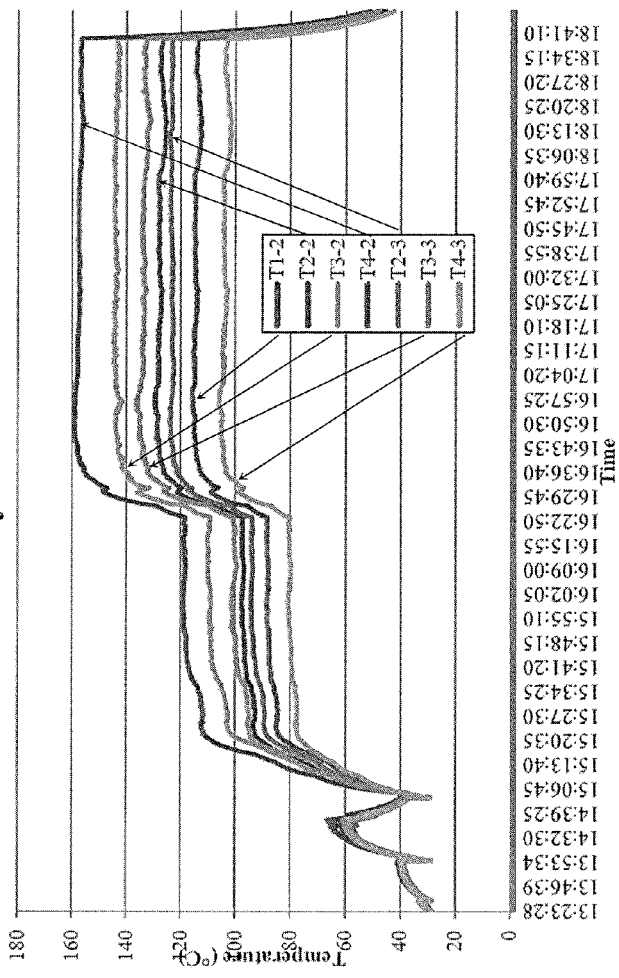
FIG. 8b illustrates temperature data from sample 2A.
Figure 8C:
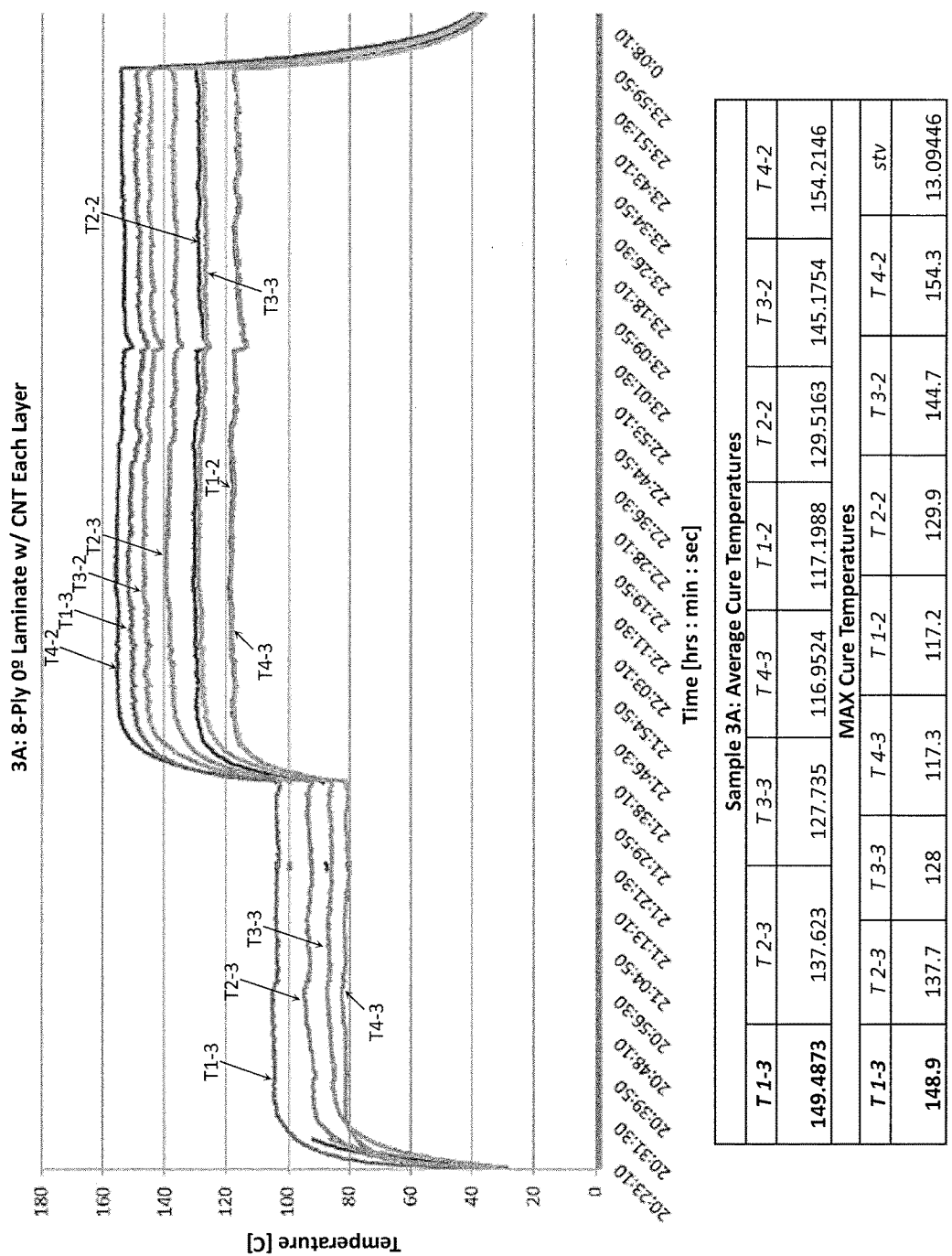
FIG. 8c illustrates temperature data from sample 3A.

FIGS. 6 and 7 show the recorded temperatures from samples with fibers oriented perpendicular to the flow of current. In this orientation, the conductivity of the epoxy dominates as there are now continuous fibers for current to travel on. Sample 5A (without CNTs) showed higher temperatures at all but one location for this test. Sample 6A showed a lower standard deviation amongst temperature readings. The gaps in FIG. 7 are the result of a failure in the data logging equipment. The application of current was continuous for both samples. FIG. 8a shows the maximum temperature attained with the available power supply, while FIGS. 8b and 8c illustrate temperature data from samples 2A and 3A, which were fabricated using 8-ply 0° laminate with and without CNTs, respectively.

SBS tests were performed on samples 1A, 1B, 2A, 3A, and 4A. The various samples were cured under an atmospheric-pressure vacuum bag, where parameters investigated were: (1) cure type (i.e., resistive vs. oven); (2) orientation of CFs; and (3) presence of CNTs (e.g., Variable layering, and Channeling). The SBS test is a destructive test designed to compare the short-beam strength of composite structures and layups. The short-beam strength of a composite is directly related to interlaminar shear strength. Before the testing begins the short-beam strength can be estimated using Equation 3:

$$F^{sbs} = \frac{3P_m}{4bh} \quad \text{Equation 3}$$

Where: Fsbs=short-beam strength MPa (psi), Pm=maximum load observed during the test, N (lbf), b=measured specimen width, mm (in.), and h=measured specimen thickness, mm (in.).

The approximate size of a specimen for SBS tests has a width of 4 times the thickness and a length of 6 times the thickness. The setup of the SBS test is performed akin to a 3-point bend test, where two-spaced cylindrical supports are positioned on one side of the sample, and a single cylindrical supports is positioned on the opposite side approximately, about midway between the two cylindrical supports on the other side. The diameters of the cylindrical supports employed during the shear test were each 0.25 in.

Figure 9:
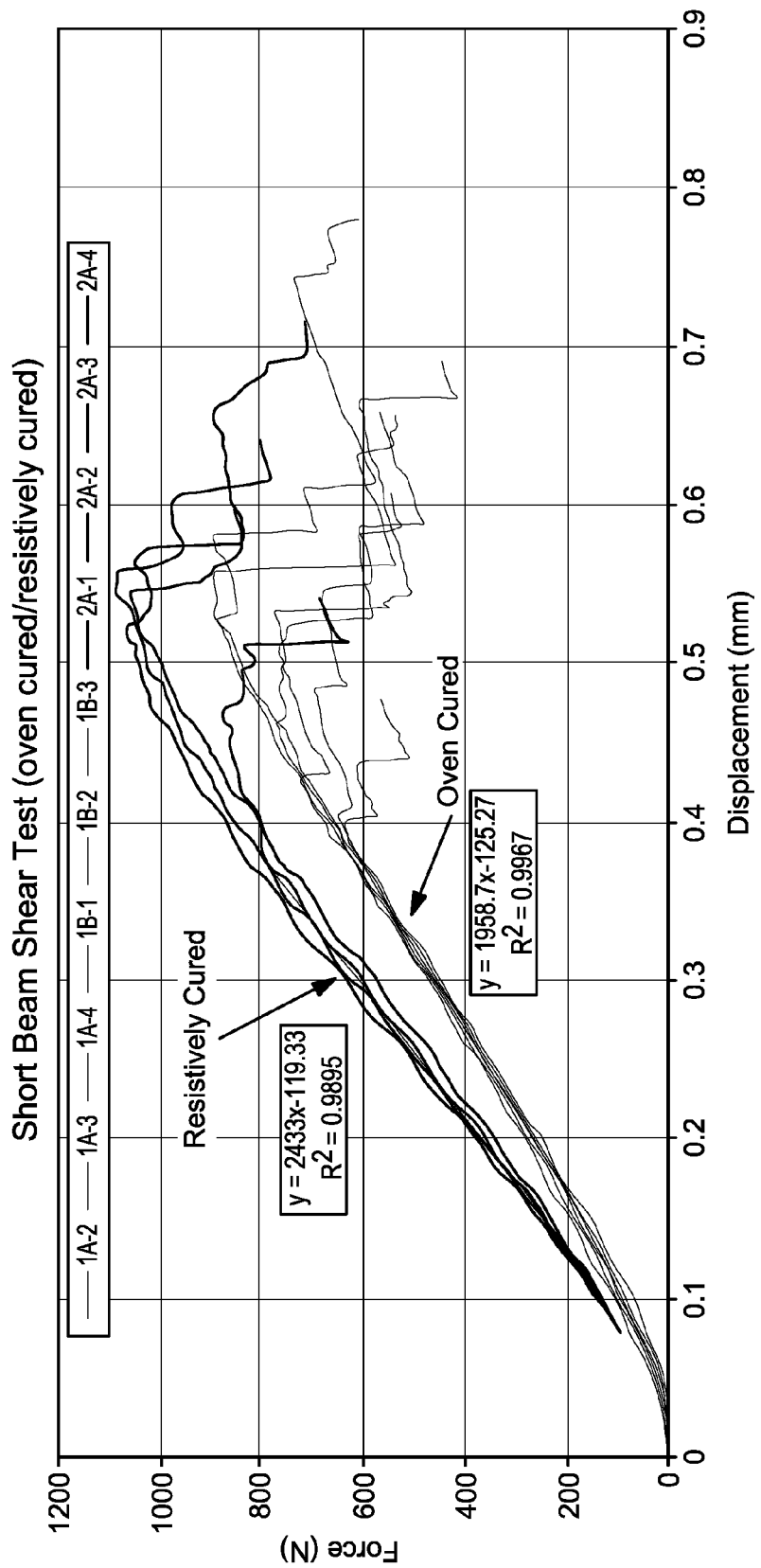
FIG. 9 shows a direct force to displacement comparison between the oven and resistively cured samples.

FIG. 9 shows a direct force to displacement comparison between the oven-cured samples, 1A/B and the resistively cured samples 2A. FIG. 9 reveals that the force required to displace an electrically cured short-beam specimen are greater than the force required to displace an oven-cured short-beam specimen. The test specimen from 1A and 1B require a force of 2.5 kN to displace a specimen 1 mm while the 2A specimen are resistively cured and require a force of nearly 2 kN to displace a specimen 1 mm. This correlation can be directly related to the increase in the short-beam strength. The resistive heating of the carbon composite cures the matrix from the inside to the outside allowing the matrix to cure more consistently throughout the composite leading to an increase in interlaminate shear strength. The heat input from the oven is being absorbed by the carbon rather than of having the carbon exhaust the heat into the matrix. Using Equation 3 for samples with a thickness of 1.016 mm (0.04 in), a width of 6.33 mm (0.249 in), and an estimated short-beam strength of 100 MPa, an estimated force to cause failure was calculated to be close to 850 N. The reliability of this calculation depends on a variety of conditions including cure pressure and temperature. Looking at FIG. 9, the failure has a wide range on the averaging around the expected force of 850 N.

Figure 10:
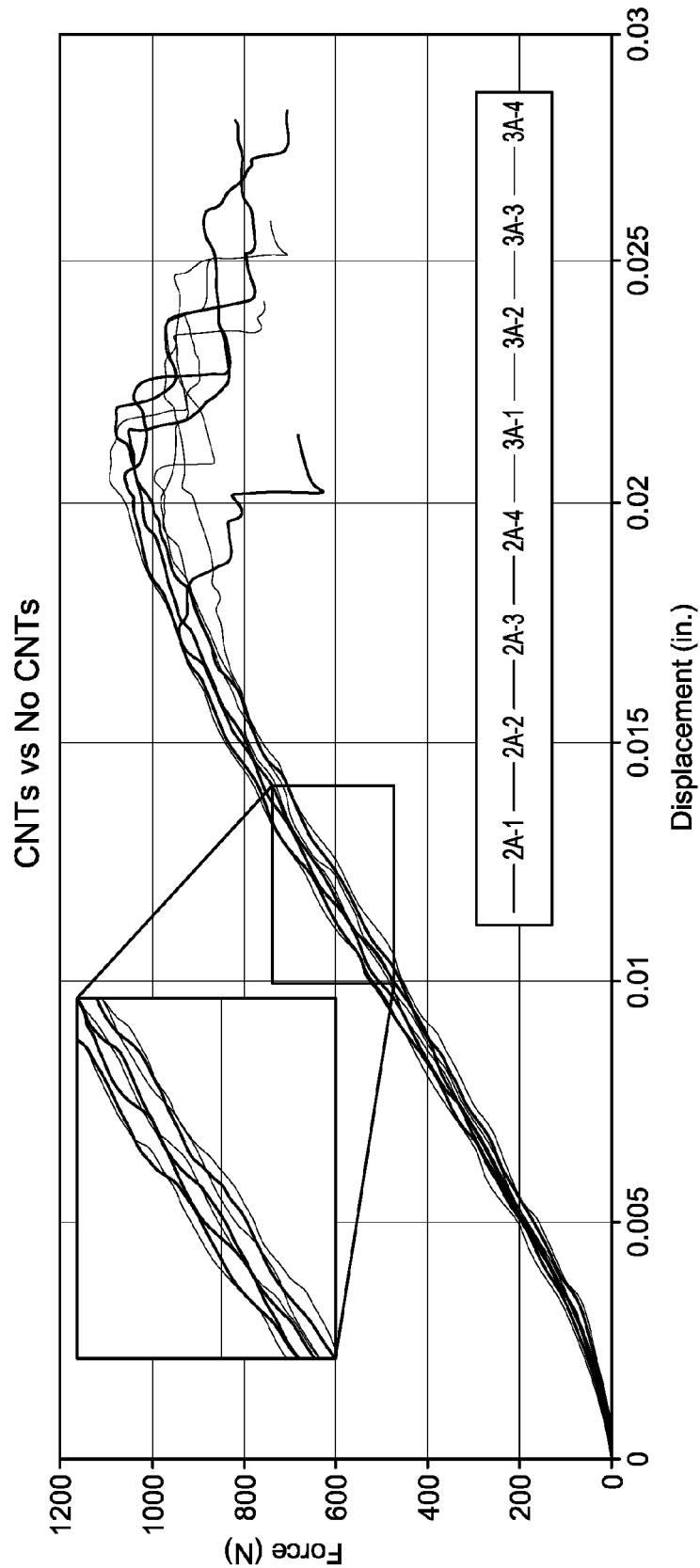
FIG. 10 illustrates a chart of the short-beam shear test results for the oven and resistively cured samples.
Figure 11:
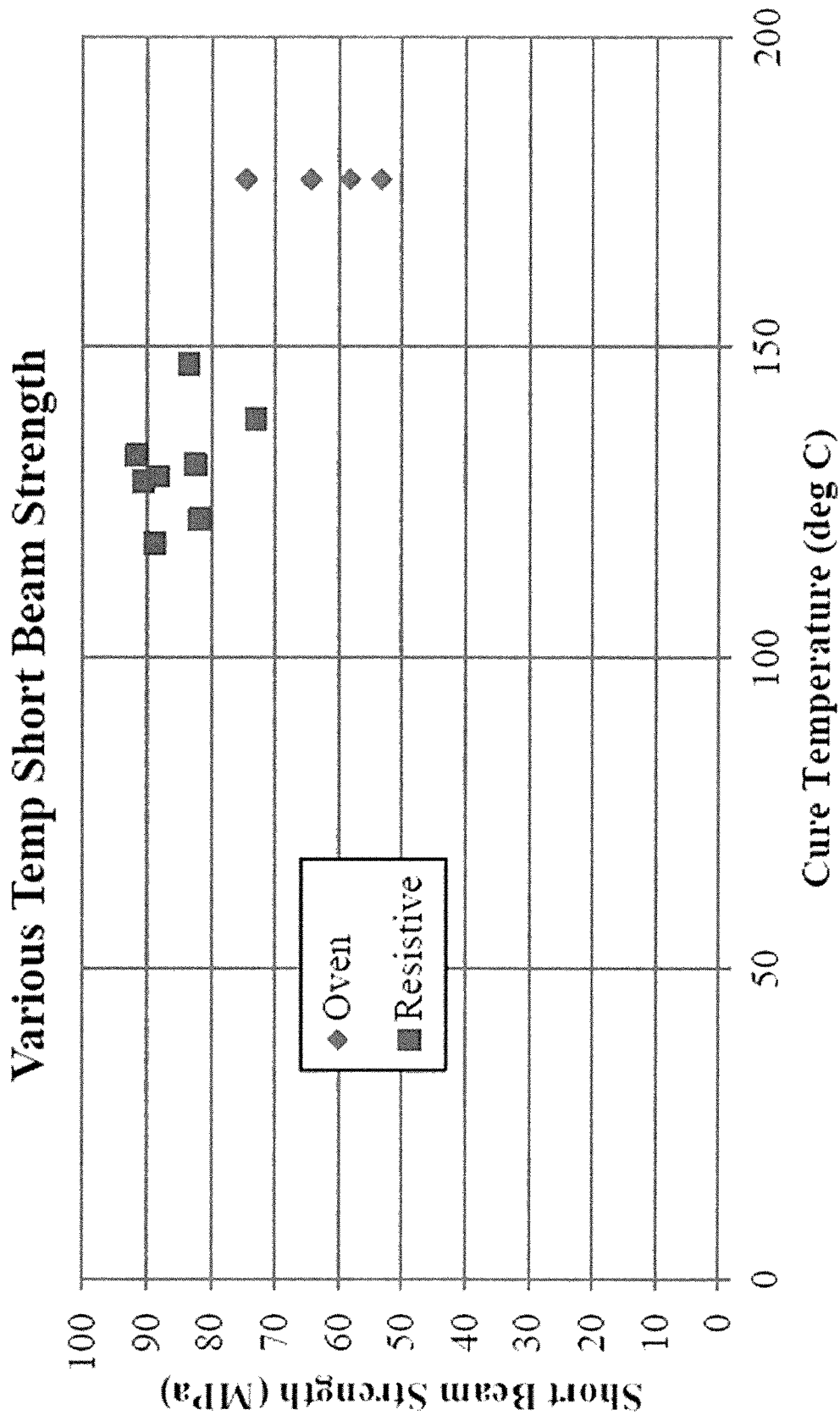
FIG. 11 illustrates a chart of the short-beam strength comparison between the oven and resistively cured samples.

SBS tests performed on specimen gathered from CNT sample 3A were compared to the non-CNT sample 2A. Instead of sample 3A having a stronger interlaminar shear strength, the test results were unexpectedly similar to the test results obtained by sample 2A as shown in FIG. 10. The resistively cured samples cured at a lower temperature than the oven-cured samples had greater SBS strength as shown in FIG. 11.

The results from the resistive-cure vs. the oven-cure analysis verified the lower cure temperatures. Improving mechanical properties was also verified by the SBS test results. However, there was no improvement found to thermal or mechanical properties due to the application of CNTs within the laminate structure. Due to the low conductivity of the epoxy, orientation of the fibers other than 0° greatly increased the resistance thus requiring more power to achieve the same curing temperature.

There is currently a very high incentive to pursue OOA processes to save large amounts of time and money while still achieving the required final mechanical properties. By taking advantage of the low electrical resistance of CF reinforcements, composite structures can be heated via electric current to assist the curing process. Experiments provided have shown several advantages. The advantages are, without limitations, lower energy input requirement, greater temperature control, smaller equipment size, more complete curing, and possible improvements in mechanical properties.

The laminate used for this project had a high cure temperature. To cure a 90° laminate, a larger power supply may be needed, or using low-temperature epoxy laminates. Because the resistive-cured samples cured at a lower temperature, temperature profiles may be created specifically for resistance cure similar to those for oven cure. Further, a 2-part tool may be used to minimize heat loss through radiation.

While the present technology is generally described in the context of aerial vehicles, other composite structures may similarly benefit from such technology, such as automobiles, watercraft, windmill blades, helicopter blades, etc. Further, while the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents, all articles, brochures, and all other published documents discussed above are hereby incorporated by reference into the Detailed Description of the Preferred Embodiments.

What is claimed is:

1. A composite structure cured by a process comprising the steps of:

electrically coupling a first lead to a first portion of the composite structure, wherein the composite structure comprises two layers of pre-impregnated carbon fiber 0° laminate material;

electrically coupling a second lead to a second portion of the composite structure;

passing an electric current through the composite structure from the first portion to the second portion using an electric power source to increase a temperature of a portion of the composite structure to a predetermined temperature; and subjecting the composite structure to pressure using a vacuum when the electric current passes through the composite structure.

2. The composite structure of claim 1, wherein a carbon nanotube material is positioned between the two layers of pre-impregnated carbon fiber 0° laminate material.

3. The composite structure of claim 1, wherein an electrical contact is positioned between the two layers of pre-impregnated carbon fiber 0° laminate material at each of the first portion and the second portion to improve conductivity across the composite structure.

4. The composite structure of claim 1, wherein the composite structure is laid up using a tool and cured while the composite structure is freestanding.

5. The composite structure of claim 4, wherein the tool and the composite structure have a same or a similar coefficient of thermal expansion.

6. The composite structure of claim 3, wherein the electrical contact is copper tape.

7. The composite structure of claim 4, wherein the composite structure is insulated from the tool using an insulated material.

8. The composite structure of claim 2, wherein the first portion is located near a first edge of the composite structure and the the second portion is located near a second edge of the composite structure, and wherein the portion of the composite structure includes at least a region between the first edge and the second edge.

9. The composite structure of claim 1, wherein the temperature of the portion is measured via a thermocouple positioned at a surface of the composite structure.

10. The composite structure of claim 1, wherein the composite structure is positioned electrically in series with a resistive load during the process such that the electric power source passes the electric current through the composite structure and the resistive load, wherein the resistive load comprises two or more resistors electrically connected to one another in parallel.

11. The composite structure of claim 1, wherein the composite structure does not comprise a carbon nanotube material.

12. A composite structure comprising:

a composite laminate comprising a first material ply and a second material ply, wherein the composite structure is cured by a process comprising the steps of:

passing an electric current through the composite structure from a first portion of the composite structure to a second portion composite structure using an electric power source to increase a temperature of a portion of the composite structure to a predetermined temperature, wherein an electrical contact is positioned between the first material ply and the second material ply at each of the first portion and the second portion to improve conductivity across the composite structure; and subjecting the composite structure to pressure using a vacuum while the electric current passes through the composite structure.

13. The composite structure of claim 12, wherein the composite structure comprises an embeddable conductor layer between the first material ply and the second material ply.

14. The composite structure of claim 13, wherein the embeddable conductor layer comprises a graphene material.

15. The composite structure of claim 13, wherein the embeddable conductor layer comprises a carbon nanotube (CNT) material.

16. The composite structure of claim 15, wherein the CNT material is vertically-aligned with the first material ply and the second material ply.

17. The composite structure of claim 15, wherein the CNT material is aligned in-plane with the first material ply and the second material ply.

18. The composite structure of claim 15, wherein the CNT material is arranged in a zig-zag pattern.

19. The composite structure of claim 12, wherein the composite structure does not comprise a carbon nanotube material.

20. A composite structure comprising:
a composite laminate comprising a first material ply and a second material ply, wherein the composite structure is cured by a process comprising the steps of:
passing an electric current through the composite structure using an electric power source to increase a temperature of a portion of the composite structure to a predetermined temperature, wherein the composite structure does not comprise a carbon nanotube material; and
subjecting the composite structure to a vacuum pressure while the electric current passes through the composite structure.

21. The composite structure of claim 20, wherein the electric power source is coupled to the composite structure via a first and a second electrical contact to improve conductivity across the composite structure, wherein each of the first electrical contact and the second electrical contact is positioned between the first material ply and the second material ply.

22. The composite structure of claim 21, wherein each of the first and the second electrical contact is a copper tape.

23. The composite structure of claim 20, wherein the composite structure is cured while the composite structure is freestanding.

24. The composite structure of claim 23, wherein the composite structure is laid up using a tool having a coefficient of thermal expansion that is substantially similar to a coefficient of thermal expansion of the composite structure.

25. The composite structure of claim 1, wherein the composite structure is positioned electrically in series with a resistive load such that the electric power source passes the electric current through the composite structure and the resistive load.

* * * * *